United States Patent
Aghajanzadeh et al.

(10) Patent No.: US 11,621,754 B2
(45) Date of Patent: Apr. 4, 2023

(54) ANALOG BEAMFORMING METHOD FOR MITIGATING BEAM SQUINT EFFECT IN WIDEBAND PHASED ARRAY ANTENNAS

(71) Applicants: Sahar Molla Aghajanzadeh, Kanata (CA); Peyman Neshaastegaran, Ottawa (CA); Ming Jian, Kanata (CA)

(72) Inventors: Sahar Molla Aghajanzadeh, Kanata (CA); Peyman Neshaastegaran, Ottawa (CA); Ming Jian, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 195 days.

(21) Appl. No.: 17/066,615

(22) Filed: Oct. 9, 2020

(65) Prior Publication Data

US 2022/0116086 A1    Apr. 14, 2022

(51) Int. Cl.
    *H04B 7/06*    (2006.01)
    *H04W 16/28*   (2009.01)
    *H04B 7/0456*  (2017.01)
    *H04B 7/0408*  (2017.01)

(52) U.S. Cl.
    CPC ......... *H04B 7/0617* (2013.01); *H04B 7/0408* (2013.01); *H04B 7/0456* (2013.01); *H04W 16/28* (2013.01)

(58) Field of Classification Search
    CPC .. H04B 7/0617; H04B 7/0408; H04B 7/0456; H04W 16/28
    USPC ......................................................... 375/267
    See application file for complete search history.

(56) References Cited

U.S. PATENT DOCUMENTS

2017/0288769 A1* 10/2017 Miller ................ H04B 7/18541
2019/0173537 A1    6/2019 Cai et al.

FOREIGN PATENT DOCUMENTS

| CN | 107251321 A | 10/2017 |
| CN | 109547080 A | 3/2019 |
| KR | 20020037965 A * | 5/2020 |
| WO | WO-2020110005 A1 * | 6/2020 ............... H04B 7/06 |

OTHER PUBLICATIONS

M. Longbrake, "True time-delay beamsteering for radar," in 2012 IEEE National Aerospace and Electronics Conference (NAECON), Jul. 2012.

S. Kalia, S. A. Patnaik, B. Sadhu, M. Sturm, M. Elbadry, and R. Harjani, "Multi-beam spatio-spectral beamforming receiver for wideband phased arrays," IEEE Transactions on Circuits and Systems-I: Regular Papers, vol. 60, No. 8, Aug. 2013.

Z. Liu, W. Ur Rehman, X. Xu, and X. Tao, "Minimize beam squint solutions for 60 GHz millimeter-wave communication system," In IEEE 78th Vehicular Technology Conference (VTC 2013—Fall), Sep. 2013.

(Continued)

*Primary Examiner* — Leila Malek

(57) ABSTRACT

A method of beam steering is provided to address the squint effect that occurs in phased array antennas when wideband signals are transmitted. Beam steering weights are computed based on an optimization that takes into account performance at a set of frequencies across a bandwidth of interest, including at least endpoints of the bandwidth, and a design frequency.

17 Claims, 9 Drawing Sheets

(56) References Cited

OTHER PUBLICATIONS

M. Cai, K. Gao, D. Nie, B. Hochwald, J. N. Laneman, H. Huang, and K. Liu, "Effect of wideband beam squint on codebook design in phased-array wireless systems," in 2016 IEEE Global Communications Conference (GLOBECOM), Dec. 2016.

Ximei Liu et al: Space-Time Block Coding-Based Beamforming for Beam Squint Compensation, Feb. 28, 2019, total 4 pages.

Nelson Jorge G. Fonseca et al: Cancellation of Beam Squint with Frequency in Serial Beamforming Network-Fed Linear Array Antennas, Feb. 29, 2012, total 8 pages.

* cited by examiner

ANALOG BEAMFORMING METHOD FOR MITIGATING BEAM SQUINT EFFECT IN WIDEBAND PHASED ARRAY ANTENNAS

FIELD

The application relates to wireless communications generally, and more specifically to analog beamforming methods.

BACKGROUND mmWave communications has been considered as a promising technology to support very high data rates in 5G and beyond generations of wireless communications. Analog beamforming with phased array antennas is a low cost and low complexity technique for wireless communication in mmWave frequencies. The phased array antenna systems can be implemented via time delays or phase shifters. When phase shifters are used for beam steering, the direction of the beam is frequency dependent. Therefore, in a wideband system, the beam focus angle will be different for different frequencies; this effect is called "beam squint".

With beam squint, the beam peak is steered to the desired angle only at the design frequency, $f_0$. However, the beam peak angle is reduced relative to the desired angle for frequencies above $f_0$ and increased relative to the desired angle for frequencies below $f_0$. This causes a power loss at the desired steering angle for the frequencies other than $f_0$. For example, consider a 32×32 uniform rectangular array (URA) designed at $f_0=25.85$ GHz, steering at $\theta_0=30°$ (elevation angle) and $\varphi_0=60°$ (azimuth angle) and operating at f=24.25-27.45 GHz. It can be shown (with mathematical equations and also simulation) that at $f_{min}=24.25$ GHz, the beam peak angles increase to $\theta=32.21°$ and $\varphi=70.89°$. In addition, at $f_{max}=27.45$ GHz, the beam peak angles decrease to $\theta=28.09°$ and $\varphi=53.19°$. This beam squint results in a 14 dB power loss at the desired angle, $[\theta_0, \varphi_0]=[30°, 60°]$ at $f_{min}$ and $f_{max}$.

Beam squint increases with increased bandwidth and also increases with an increase in the desired steering angle from boresight. True Time Delay (TTD) is a hardware solution which is commonly used to combat the beam squint effect in phased array radar systems. See M. Longbrake, "True time-delay beamsteering for radar," in 2012 *IEEE National Aerospace and Electronics Conference (NAECON)*, July 2012. However, this solution is undesirable in wireless communications due to the high circuit complexity, high implementation cost, large size, and excessive power consumption.

Other hardware approaches rather than TTD have been proposed to reduce beam squint effect. In S. Kalia, S. A. Patnaik, B. Sadhu, M. Sturm, M. Elbadry, and R. Harjani, "Multi-beam spatio-spectral beamforming receiver for wideband phased arrays," *IEEE Transactions on Circuits and Systems-I: Regular Papers*, vol. 60, no. 8, August 2013, a spatio-spectral beamforming receiver has been proposed, wherein an N point analog Fast Fourier Transform (FFT) scheme is employed to slice the whole frequency band into N equal parts and each frequency slice is processed by a dedicated phase shifter. The accuracy of the beam steering is proportional to the number of frequency slices (FFT points). It has been shown that the proposed technique can reduce the squint error considerably. However, the number of required phase shifters increases by a factor of frequency slices; in addition, implementing analog FFT circuits brings extra cost and complexity to the system. In Z. Liu, W. Ur Rehman, X. Xu, and X. Tao, "Minimize beam squint solutions for 60 GHz millimeter-wave communication system," In *IEEE 78th Vehicular Technology Conference (VTC 2013-Fall)*, September 2013, a phase improvement scheme is provided, in which banks of band-pass filters at mmWave frequency are deployed to separate signals into smaller sub-bands; additional phase shifters are added to each sub-band to reduce the beam squint of each sub-band. The proposed method can reduce the beam squint effect but additional phase shifters and band-pass filters in mmWave frequency increase the implementation cost and complexity.

Another method was proposed in M. Cai, K. Gao, D. Nie, B. Hochwald, J. N. Laneman, H. Huang, and K. Liu, "Effect of wideband beam squint on codebook design in phased-array wireless systems," in 2016 *IEEE Global Communications Conference (GLOBECOM)*, December 2016 which increases the density of the beamforming codebook. Switched analog beamforming has been considered, i.e., a discrete codebook consisting of multiple beams; each beam focuses on a certain range of angles. It has been shown that the effective beamwidth of each beam decreases because of the beam squint; therefore, the number of beams in the codebook must increase, i.e., a denser codebook is required to counter this effect. One of the disadvantages of the proposed scheme is that recursive procedures are required to derive the minimum codebook size and each beam's focus angle. In addition, having larger codebooks increases the beamforming time and causes latency. Furthermore, only 1-D uniform linear arrays (ULA) have been considered in this paper, while 2-D planar arrays are commonly used in the practical systems.

Conventional beamforming techniques mainly focus on maximizing the array gain at a desired steering angle for the design frequency. This does not provide efficient use of the antenna array in the wideband system because the array gain is not maximized at the desired angle for the other frequencies in the band due to the squint effect.

SUMMARY

A new analog beamforming technique is provided which can mitigate the beam squint effect in a wideband system without adding extra hardware. The provided method changes the original shape of the beam according to the squint value to compensate for its impairing effect. The provided approach can be deployed, for example, in 1-D ULAs or 2-D uniform planar arrays (UPAs) including rectangular and circular ones.

The proposed method efficiently uses the antenna array by maximizing its gain in the whole bandwidth at the desired angle:

$$\max_{\{w_{nm}\}} F(\theta_0, \varphi_0, f_i) \forall f_i i=1, \ldots, K.$$

where K is a design parameter which represents a tradeoff between the beam squint compensation and the half power beam width of the designed beam.

To solve the proposed multi-objective optimization problem, weighted-sum method is used:

$$\max_{\{w_{nm}\}} \sum_{i=1}^{K} \gamma_i F(\theta_0, \varphi_0, f_i).$$

where $\gamma_i$s are weighting coefficients which are real positive and satisfy: $\Sigma_{i=1}^{K} \gamma_i = 1$. The values of $\gamma_i$s indicate how much priority is assigned to each frequency. When all frequencies have the same priority, which is common in practical systems, the equal-weighted sum, i.e., $\gamma_i=1/K \forall i=1, \ldots, K$, is the appropriate choice.

A closed form equation provided for the squint mitigating beamforming weight vector which is the weighted sum of the complex conjugate of array response vector at different frequencies:

$$\vec{w} = \sum_{i=1}^{K} \gamma_i \vec{a}^*(\theta_0, \varphi_0, f_i).$$

Note that the provided technique is valid with any type of amplitude tapering, and is applicable to both 1-D uniform linear arrays (ULAs) and 2-D uniform planar arrays (UPAs), including rectangular and circular ones.

In some embodiments, the provided approach is used for beam squint mitigation in other wideband systems with phased array antennas other than mmWave communications, e.g., radar or microphone systems.

According to one aspect of the present disclosure, there is provided a method comprising: transmitting or receiving using a uniform phased array antenna having a plurality of antenna elements using a beamforming weight vector containing a respective beamforming weight for each of the plurality of antenna elements; wherein the beamforming weights are determined for a given steering angle, and for a given bandwidth $f_{min} \leq f \leq f_{max}$, that maximizes a sum of antenna array factors over a set of K frequency points distributed within the given bandwidth, wherein K is at least 3, and the set of K frequency points includes $f_{min}$, $f_{max}$, and a design frequency, $f_0$.

Optionally, the beamforming weights comprise a beamforming weight vector, $\vec{w}=[w_{11}, \ldots, w_{nm}, \ldots, w_{NM}]$, that is the complex conjugate of a sum of antenna array factors, $\vec{a}(\theta,\varphi,f)$, calculated at the frequency points $f_i$, $i=1, \ldots, K$, where the given steering angle has elevation angle $\theta$, and azimuth angle $\varphi$.

Optionally, the sum is an equally weighted sum given by:

$$\vec{w} = \sum_{i=1}^{K} \vec{a}^*(\theta_0, \varphi_0, f_i).$$

Optionally, the sum of antenna array factors is a weighted sum, with a respective weight applied to each antenna array factor.

Optionally, the beamforming weight vector, $\vec{w}=[w_{11}, \ldots, w_{nm}, \ldots, w_{NM}]$, is the complex conjugate of a weighted sum of array response vector, $\vec{a}(\theta,\varphi,f)$, calculated at the frequency points $f_i$, $i=1, \ldots, K$, where the given steering angle has elevation angle $\theta$, and azimuth angle $\varphi$.

Optionally, the beamforming weight vector is given by:

$$\vec{w} = \sum_{i=1}^{K} \theta_i \vec{a}^*(\theta_0, \varphi_0, f_i),$$

which is the weighted sum of the complex conjugate of array response vector, $\vec{a}(\theta,\Phi,f)$, calculated at the frequency points $f_i$ at the steering angle $[\theta_0, \varphi_0]$.

Optionally, the uniform phased array is a uniform linear array or a two-dimensional uniform planar array.

Optionally, the method further comprises one or both of: obtaining the beamforming weights for a given steering angle $[\theta_0, \varphi_0]$ from a lookup table, and obtaining new beamforming weights from the lookup table as the steering angle changes; obtaining the beamforming weights for a given design frequency from a lookup table and obtaining new beamforming weights from the lookup table as the steering angle changes.

According to another aspect of the present disclosure, there is provided a apparatus comprising: a uniform phase array antenna having a plurality of antenna elements; a processor and memory, wherein the memory comprising a set of beamforming weights containing a respective beamforming weight for each of the plurality of antenna elements and the processor is configured to apply the beamforming weights to the phased array antenna to configure the phased array antenna with the set of beamforming weights; wherein the apparatus is configured to transmit or receive using the uniform phased array antenna configured with the set of beamforming weights; wherein the beamforming weights are determined for a given steering angle, and for a given bandwidth $f_{min} \leq f \leq f_{max}$, that maximizes a sum of antenna array factors over a set of K frequency points distributed within the given bandwidth, wherein K is at least 3, and the set of K frequency points includes $f_{min}$, $f_{max}$, and a design frequency.

Optionally, the beamforming weights comprise a beamforming weight vector, $\vec{w}=[w_{11}, \ldots, w_{nm}, \ldots, w_{NM}]$, that is the complex conjugate of a sum of antenna array factors, $\vec{a}(\theta,\varphi,f)$, calculated at the frequency points $f_i$, $i=1, \ldots, K$, where the given steering angle has elevation angle $\theta$, and azimuth angle $\varphi$.

Optionally, the sum is an equally weighted sum given by:

$$\vec{w} = \sum_{i=1}^{K} \vec{a}^*(\theta_0, \varphi_0, f_i).$$

Optionally, the sum of antenna array factors is a weighted sum, with a respective weight applied to each antenna array factor.

Optionally, the beamforming weight vector, $\vec{w}=[w_{11}, \ldots, w_{nm}, \ldots, w_{NM}]$, is the complex conjugate of a weighted sum of array response vector, $\vec{a}(\theta,\varphi,f)$, calculated at the frequency points $f_i$, $i=1, \ldots, K$, where the given steering angle has elevation angle $\theta$, and azimuth angle $\varphi$.

Optionally, the beamforming weight vector is given by:

$$\vec{w} = \sum_{i=1}^{K} \gamma_i \vec{a}^*(\theta_0, \varphi_0, f_i),$$

which is the weighted sum of the complex conjugate of array response vector, $\vec{a}(\theta,\varphi,f)$, calculated at the frequency points $f_i$ at the steering angle $[\theta_0, \varphi_0]$.

Optionally, the uniform phased array is a uniform linear array or a two-dimensional uniform planar array.

Optionally, the apparatus further comprises: a lookup table containing said beamforming weights for different steering angles; wherein the apparatus is configured to obtain the beamforming weights for a given steering angle $[\theta_0, \varphi_0]$ from the lookup table, and to obtain new beamforming weights from the lookup table as the steering angle changes.

Optionally, the apparatus further comprises: a lookup table containing said beamforming weights for different design frequencies; wherein the apparatus is configured to obtain the beamforming weights for a given design frequency from the lookup table, and to obtain new beamforming weights from the lookup table as the design frequency changes.

According to another aspect of the present disclosure, there is provided a computer readable medium having computer executable instructions stored thereon, that when executed by a processor cause execution of a method comprising: transmitting or receiving using a uniform phased array antenna having a plurality of antenna elements using a beamforming weight vector containing a respective beamforming weight for each of the plurality of antenna elements; wherein the beamforming weights are determined for a given steering angle, and for a given bandwidth $f_{min} \leq f \leq f_{max}$, that maximizes a sum of antenna array factors over a set of K frequency points distributed within the given bandwidth, wherein K is at least 3, and the set of K frequency points includes $f_{min}$, $f_{max}$, and a design frequency, $f_0$.

Optionally, the beamforming weights comprise a beamforming weight vector, $\vec{w}=[w_{11}, \ldots, w_{nm}, \ldots, w_{NM}]$, that is the complex conjugate of a sum of antenna array factors, $\vec{a}(\theta,\varphi,f)$, calculated at the frequency points $f_i$, $i=1, \ldots, K$, where the given steering angle has elevation angle $\theta$, and azimuth angle $\varphi$.

Optionally, the sum is an equally weighted sum given by:

$$\vec{w} = \sum_{i=1}^{K} \vec{a}^*(\theta_0, \varphi_0, f_i).$$

BRIEF DESCRIPTION OF THE DRAWINGS

Embodiments of the disclosure will now be described with reference to the attached drawings in which.

DETAILED DESCRIPTION

Figure 1:
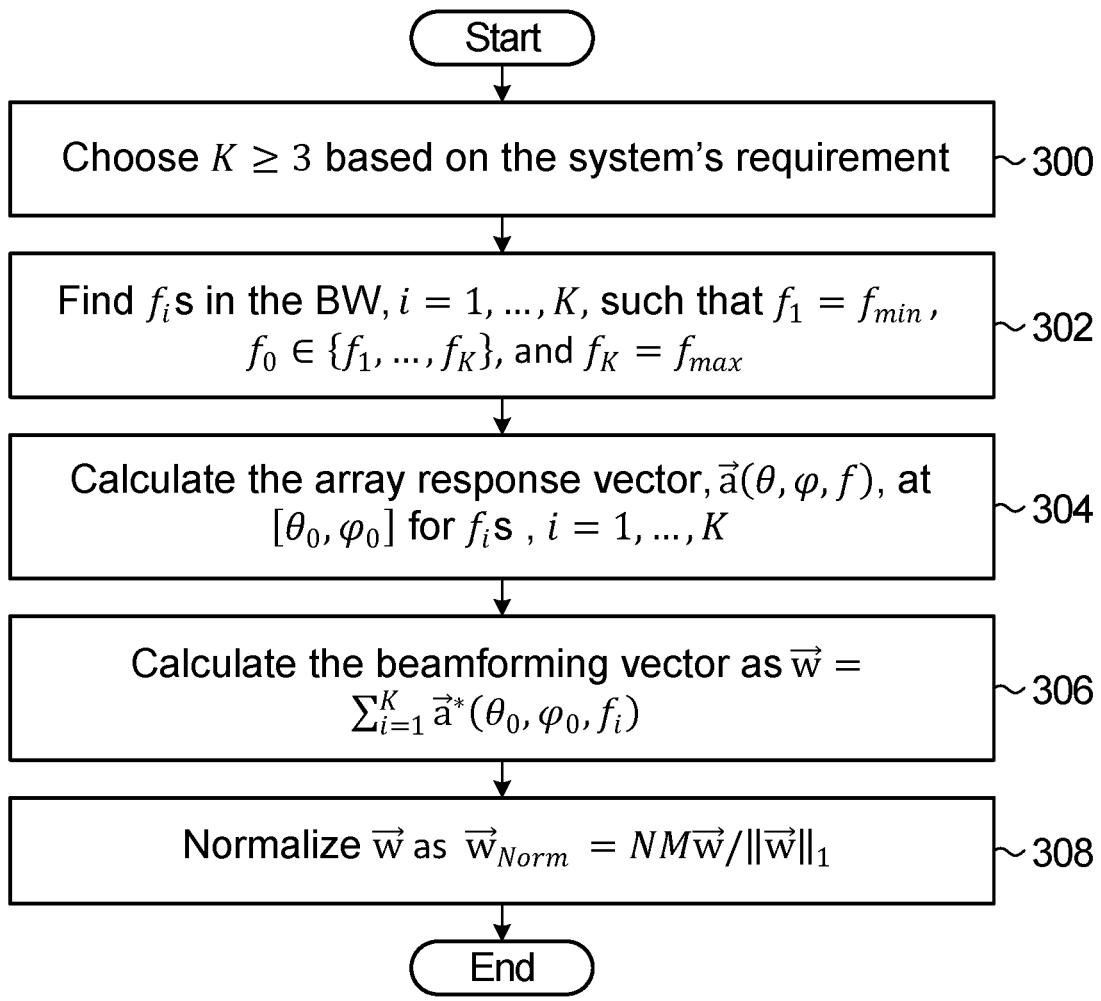
FIG. 1 is a block diagram of a method of beam forming provided by an embodiment of the disclosure.

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Consider a phased array antenna system with phase shifters operating at the design frequency $f_0$. If conventional beamforming method is used to steer the beam at the desired angles $[\theta_0, \varphi_0]$, the beam forming coefficients, $w_{nm}$s, are selected such that the array gain is maximized at $[\theta_0, \varphi_0]$. However, for a wide band system with $f_{min} \leq f \leq f_{max}$, these $w_{nm}$s maximize the array gain at $[\theta_0, \varphi_0]$ ONLY at the center frequency $f_0$. The array gain at the frequencies other than $f_0$ will be less than the maximum value because of the squint effect. Therefore, with conventional beamforming, the antenna array cannot be effectively used at the whole band.

A new beamforming method is provided which improves the array gain in the whole bandwidth. To mitigate the squint effect, the provided method maximizes the array gain at K different frequency points in the bandwidth. K is a design parameter that is explained in further detail below.

This maximization is a multi-objective optimization problem. The multi-objective optimization problem is converted to a single-objective optimization problem as detailed below, using a weighted-sum method. A closed-form solution is derived to calculate the new beamforming coefficients which mitigate the beam squint effect.

The results presented in the following are for URAs. Note that this is just an example and the same approach can be easily extended to other UPAs.

Consider a URA located on y-z plane with boresight at x axis; the array factor of this array at the frequency f can be presented as:

$$F(\theta, \varphi, f) = \sum_{n=1}^{N}\sum_{m=1}^{M} w_{nm} e^{j\frac{2\pi f}{c}\left(\left(n-\frac{N}{2}-0.5\right)d\sin\theta + \left(m-\frac{M}{2}-0.5\right)d\sin\varphi\cos\theta\right)}, \quad (1)$$

where N and M are the number of antenna elements along z and y axes, respectively, $w_{nm}$ denote beamforming coefficients, and $\theta$ and $\varphi$ are the elevation and azimuth angles, respectively.

If conventional beamforming method is used to steer the beam at the desired angles $[\theta_0, \varphi_0]$, $w_{nm}$s can be calculated as:

$$w_{nm} = e^{-j\frac{2\pi f}{c}\left(\left(n-\frac{N}{2}-0.5\right)d\sin\theta_0 + \left(m-\frac{M}{2}-0.5\right)d\sin\varphi\cos\theta_0\right)}, \quad (2)$$

which maximizes the array gain at $[\theta_0, \varphi_0]$, i.e., $F(\theta_0,\varphi_0,f)=$ NM. However, for a wide band system with $f_{min} \leq f \leq f_{max}$, this calculated set of $w_{nm}$ will maximize the array gain at $[\theta_0, \varphi_0]$ ONLY at the design frequency $f_0$; the array gain at the frequencies other than $f_0$ will be less than the maximum value (NM) because of the squint effect. In contrast, the provided method improves the array gain in the whole bandwidth.

For given steering angles $[\theta_0, \varphi_0]$, the optimization can be stated as follows:

$$\text{Problem}(I): \max_{\{w_{nm}\}} |F(\theta_0,\varphi_0,f)| \forall f_{min} \leq f \leq f_{max}. \quad (3)$$

Without loss of generality, it is assumed the set of $w_{nm}$ are odd symmetric ($w_{nm}=w_{(N-n+1)(M-m+1)}^*$); therefore, values of $F(\theta_0,\varphi_0,f)$ are real and positive. Consider K frequency points in the bandwidth with $f_1=f_{min}$, $f_0 \in \{f_1, \ldots, f_K\}$, and $f_K=f_{max}$, Problem (I) is continuous vs. frequency can be approximated by:

$$\text{Problem}(II): \max_{\{w_{nm}\}} F(\theta_0, \varphi_0, f_i) \forall f_i, i=1, \ldots, K. \quad (4)$$

where K is a design parameter, which is discrete vs. frequency. The larger the value of K, the larger the number of frequency points, and a larger number of frequency points will more accurately represent the bandwidth. As shown by simulation results, the value of the K represents a tradeoff between the beam squint compensating capability and the half power beamwidth of the resulting beam; smaller K (K is at least 3 to include the endpoints in the frequency band and the design frequency) results in better beam squint improvement but increases the half power beamwidth of the beam. The value of K should be chosen based on underlying system's requirement.

Problem (II) is a multi-objective linear optimization problem which is transformed to a single-objective optimization problem using a weighted-sum method. To solve Problem (II), the weighted sum method with equal weighting coefficients is used. This yields:

Problem (III)

$$\max_{\{w_{nm}\}} \sum_{i=1}^{K} F(\theta_0, \varphi_0, f_i). \quad (5)$$

Replacing $F(\theta_0, \varphi_0, f_i)$ from (1) in (5) results in:

$$\max_{\{w_{nm}\}} \sum_{n=1}^{N} \sum_{m=1}^{M} w_{nm} a_{nm}, \quad (6)$$

where $$a_{nm} \triangleq \sum_{i=1}^{K} e^{j\frac{2\pi f_i}{c}\left(\left(n-\frac{N}{2}-0.5\right)d\sin\theta_0 + \left(m-\frac{M}{2}-0.5\right)d\sin\varphi_0\cos\theta_0\right)}.$$

From the Cauchy-Schwartz inequality, the maximum of (6) happens at:

$$w_{nm} = a_{nm}^*, \forall n=1, \ldots, N \text{ and } \forall m=1, \ldots, M. \quad (7)$$

It can be realized from (7) that the beamforming weight vector, $\vec{w}=[w_{11}, \ldots, w_{nm}, \ldots, w_{NM}]$, is the complex conjugate of the sum of array response vector, $\vec{a}(\theta, \varphi, f)$, calculated at the frequency points $f_i$, $i=1, \ldots, K$, at the desired steering angle, i.e., $$\vec{w} = \sum_{i=1}^{K} \vec{a}^*(\theta_0, \varphi_0, f_i), \quad (8)$$

where:

$$\vec{a}(\theta, \varphi, f) = \left[ e^{j\frac{2\pi f}{c}\left(\left(0.5-\frac{N}{2}\right)d\sin\theta + \left(0.5-\frac{M}{2}\right)d\sin\varphi\cos\theta\right)}, \right. \quad (9)$$
$$\ldots, e^{j\frac{2\pi f}{c}\left(\left(n-\frac{N}{2}-0.5\right)d\sin\theta + \left(m-\frac{M}{2}-0.5\right)d\sin\varphi\cos\theta\right)},$$
$$\left. \ldots e^{j\frac{2\pi f}{c}\left(\left(\frac{N}{2}-0.5\right)d\sin\theta + \left(\frac{M}{2}-0.5\right)d\sin\varphi\cos\theta\right)} \right].$$

In some embodiments, to avoid extra power consumption, the derived beamforming vector in (8) is normalized as:

$$\vec{w}_{Norm} = NM\vec{w}/\|\vec{w}\|_1, \quad (10)$$

where $$\|\vec{w}\|_1 = \sum_{n=1}^{N}\sum_{m=1}^{M} |w_{nm}|$$

is the $l_1$ norm of $\vec{w}$.

Referring now to FIG. 1, shown is a block diagram of the method. The method begins in block 300 with choosing based on the system's requirements. The method continues in block 302 with finding the frequency points $f_i$ in the BW, $i=1, \ldots, K$, such that $f_1=f_{min}$, $f_0 \in \{f_1, \ldots, f_K\}$, and $f_K=f_{max}$. The method continues in block 304 with calculating the array response vector, $a(\theta, \varphi, f)$, at $[\theta_0, \varphi_0]$ for $f_i$s, $i=1, \ldots, K$. The method continues in block 306 with calculating the beamforming vector as $$\vec{w} = \sum_{i=1}^{K} \vec{a}^*(\theta_0, \varphi_0, f_i).$$

The method continues in block 308 with normalizing $\vec{w}$ as $\vec{w}_{Norm} = NM\vec{w}/\|\vec{w}\|_1$.

Performance Evaluation

In this section, some numerical results are presented which were obtained by using Matlab programming, which evaluate the performance of the provided method. The provided method can be deployed in any URA or UPA with arbitrary specifics; these results only provide some examples for more understanding.

Figure 2A:
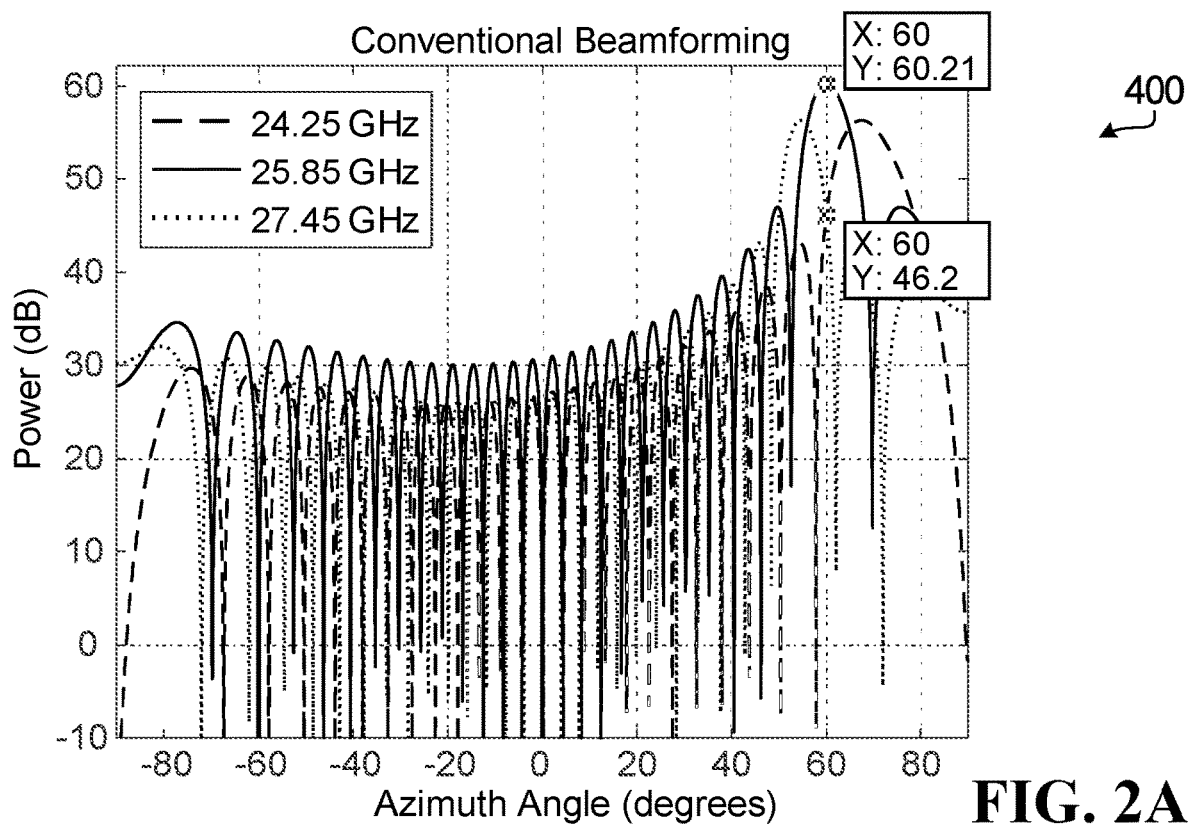
FIGS. 2A and 2B contain plots depicting power pattern of a 32×32 URA operating at 26-GHz band steering at [30°, 60°] for conventional beamforming and provided method.
Figure 2B:
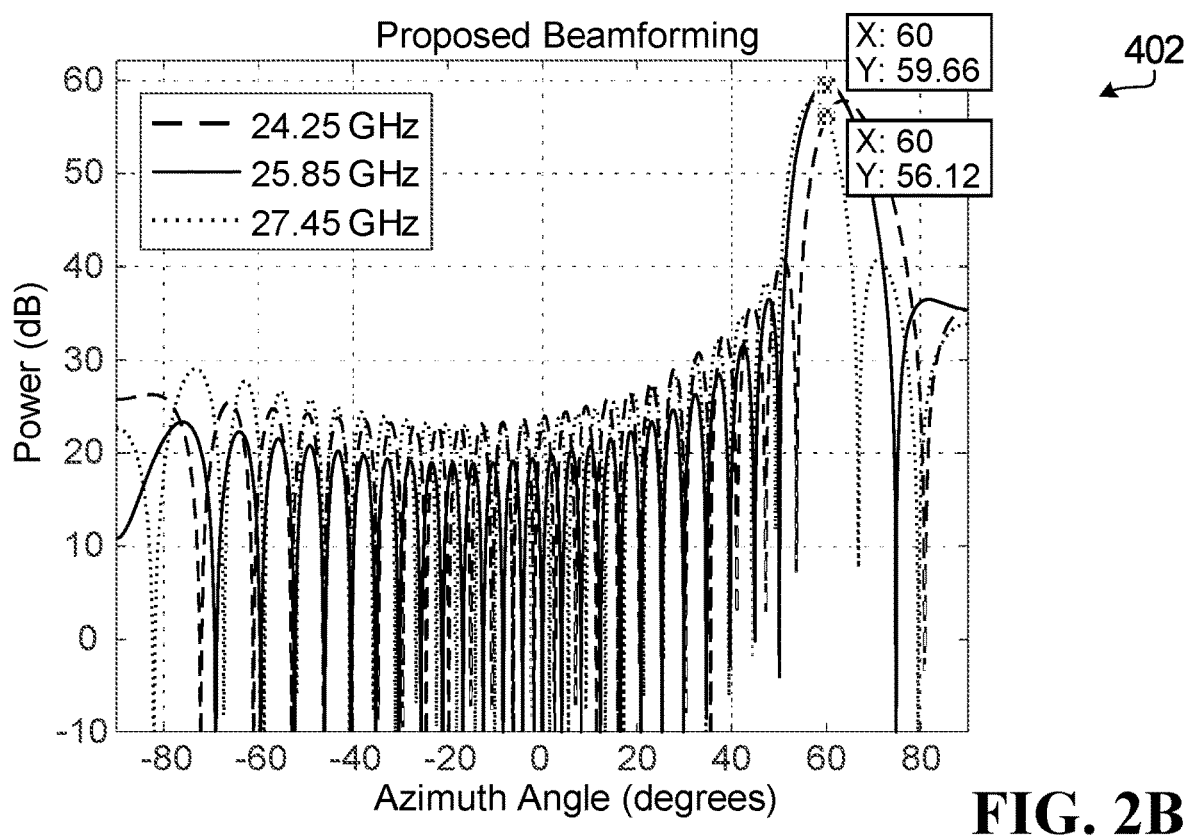

Consider a 32×32 URA with 3.2 GHz bandwidth and design frequency at $f_0=25.85$ GHz. The array is supposed to steer the beam at the desired angle $[\theta_0, \varphi_0]=[30°, 60°]$ for all frequencies in the band. FIGS. 2A and 2B depict the power pattern of the array, $|F(\theta, \varphi, f)|^2$, in dB at the azimuth plane with conventional beamforming generally indicated at 400 and the provided squint mitigating beamforming generally indicated at 402. The curves are sketched for three different frequencies in the band: the lowest frequency $f_{min}=24.25$ GHz, $f_0$, and the highest frequency $f_{max}=27.45$ GHz. For the purpose of this example, K=5 frequency points in the band are used for the optimization in (5). As can be seen, by using the provided method (results 402) compared to the conventional method (results 400), the maximum value of the power at the center frequency $f_0$ has dropped a small amount (0.55 dB), and the power of the edge frequencies ($f_{min}$ and $f_{max}$) has improved significantly (9.9 dB=71% improvement) at the desired angle [30°, 60°]. In addition, the beam became wider with lower side lobe levels at the azimuth plane.

Figure 3A:
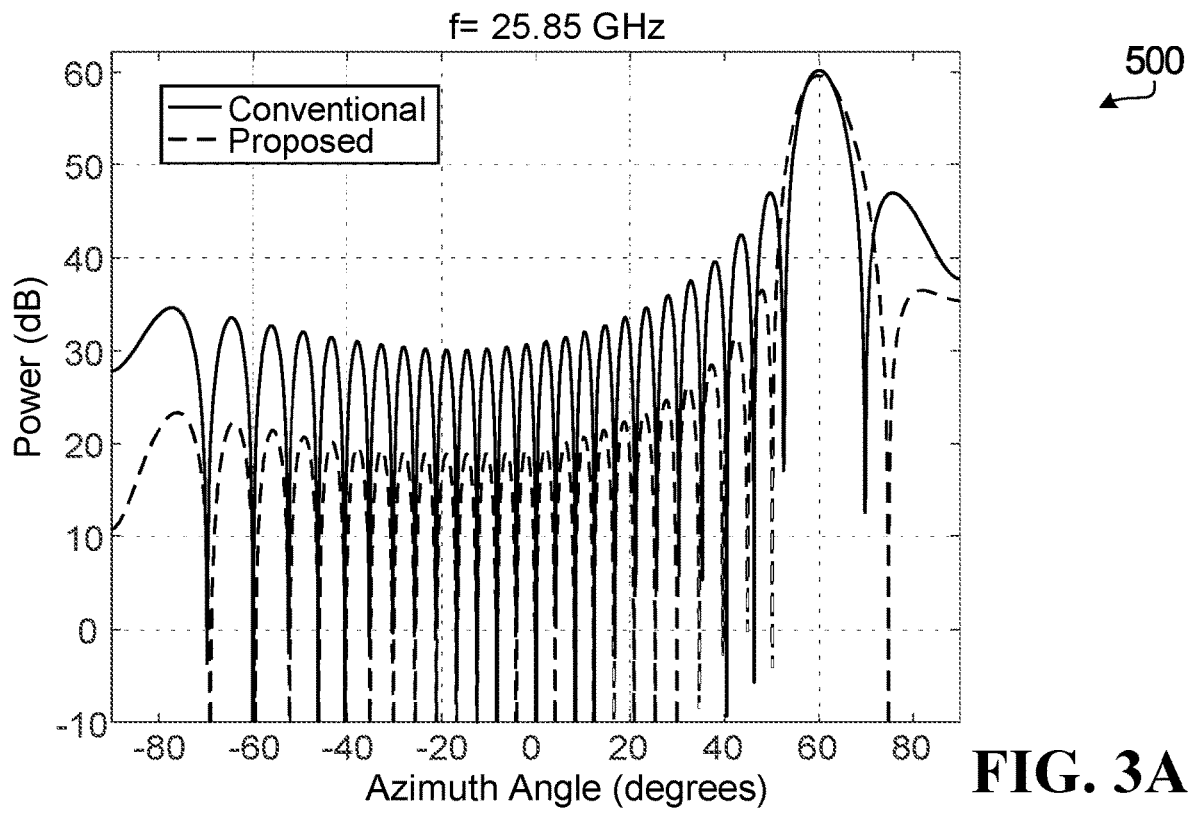
FIGS. 3A, 3B and 3C contain plots depicting an original power pattern (with conventional method) versus the provided method for $f=f_0$, $f=f_{min}$, and $f=f_{max}$ steering at [30°, 60°].
Figure 3B:
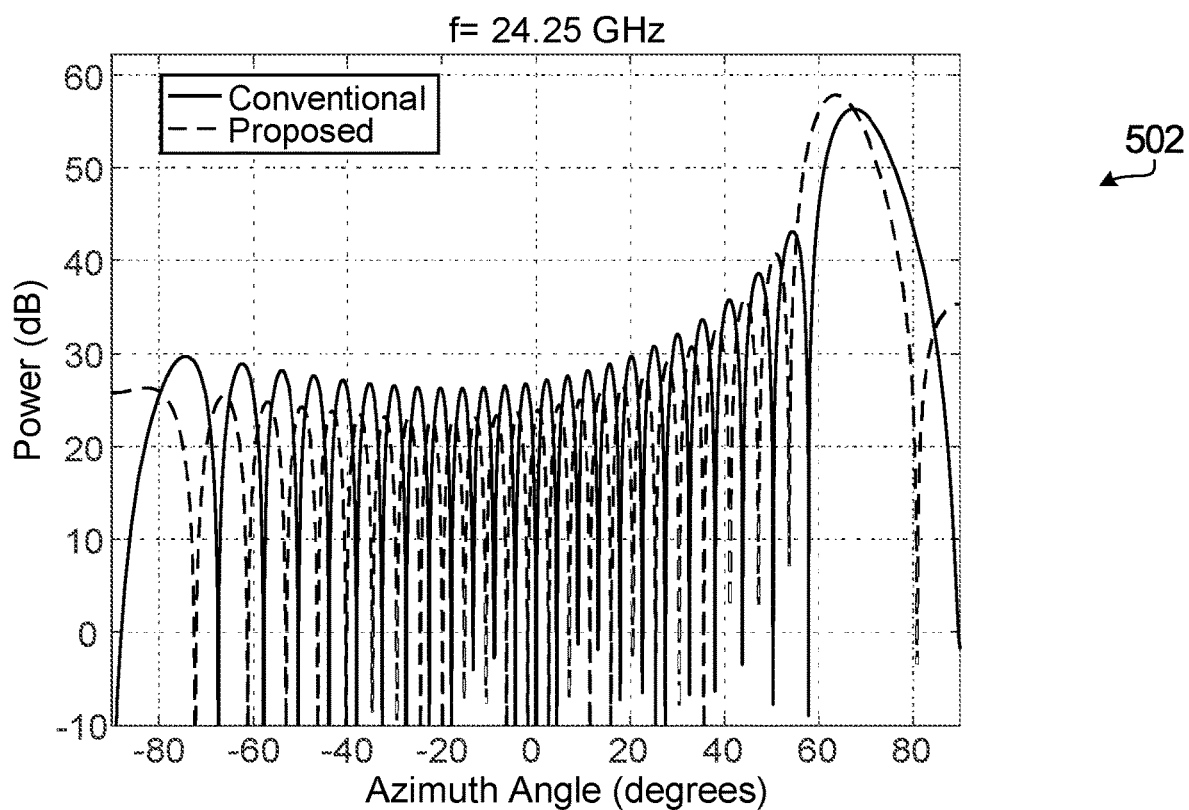
Figure 3C:
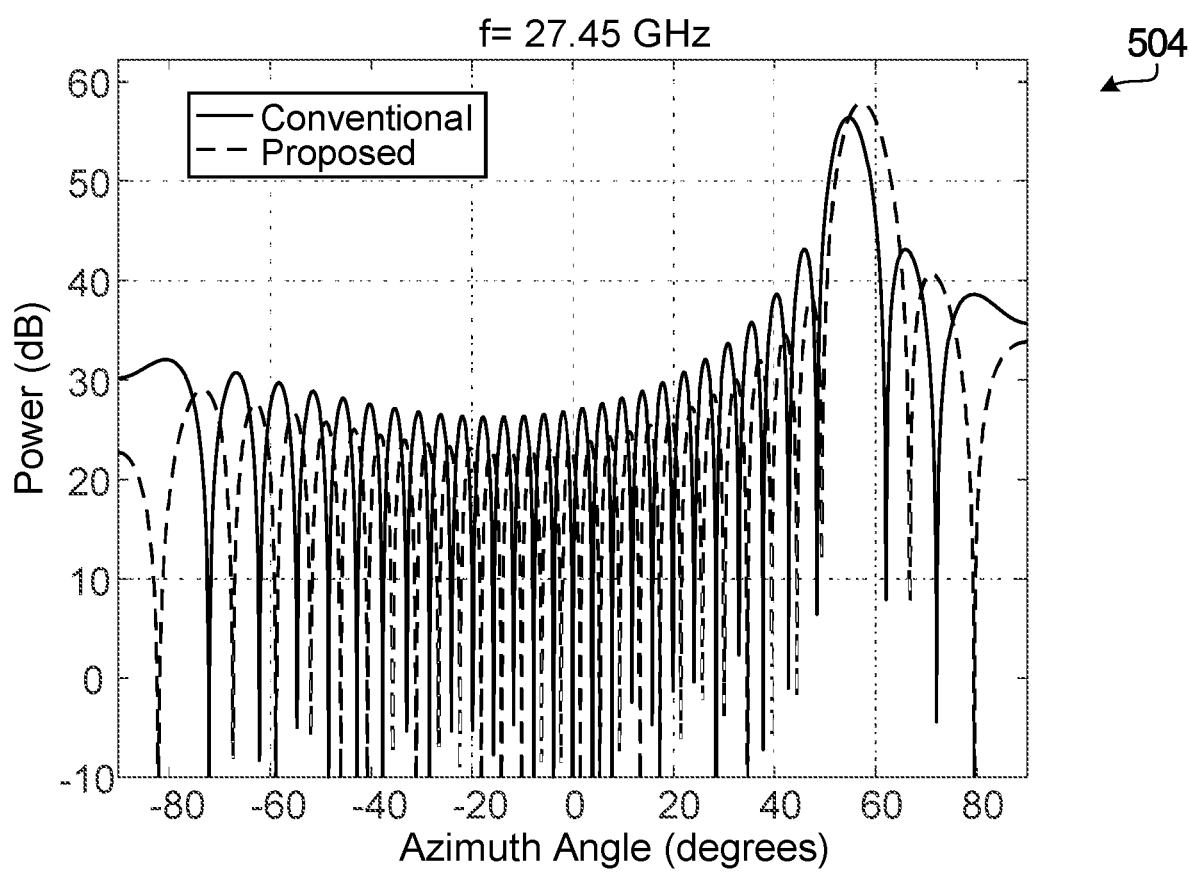
Figure 4A:
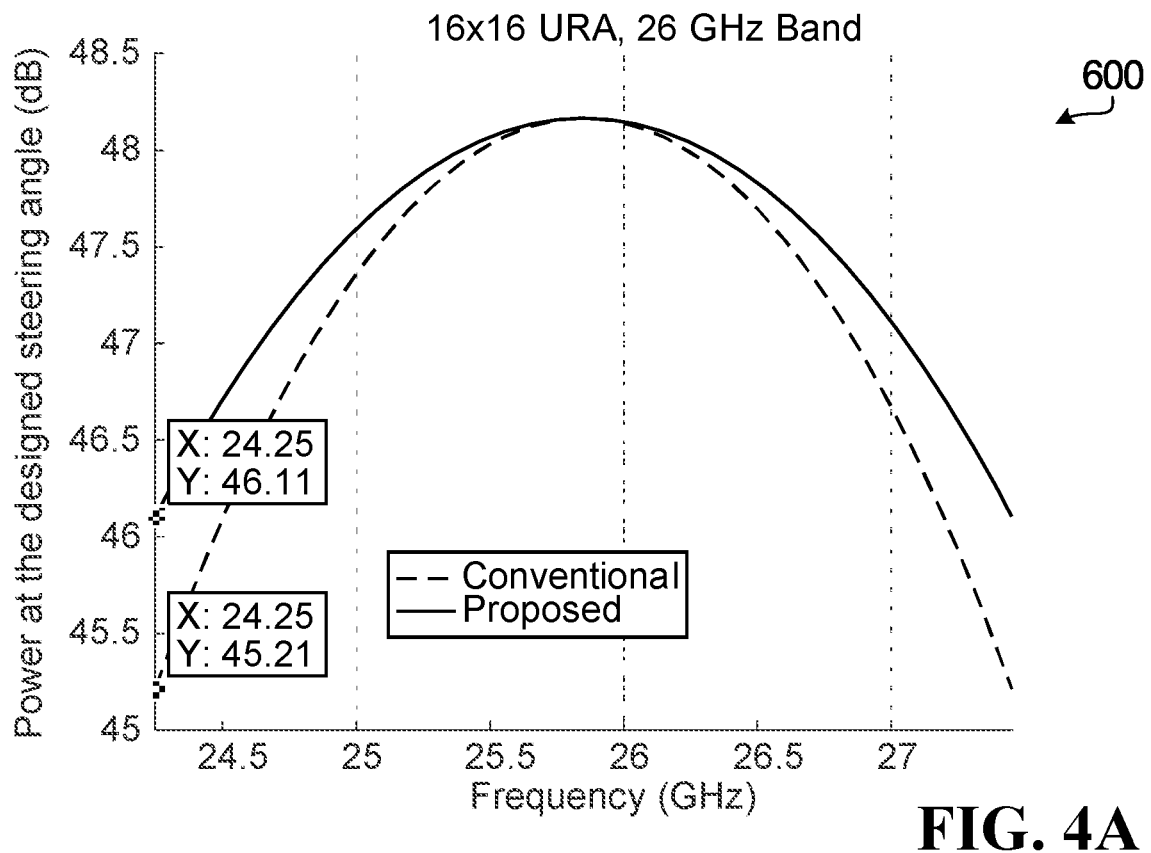
FIGS. 4A, 4B, 4C and 4D contain plots depicting power value (dB) at the desired steering angle [30°, 60°] for all frequencies in the band for four different system configuration using the conventional beamforming method and the provided method.
Figure 4B:
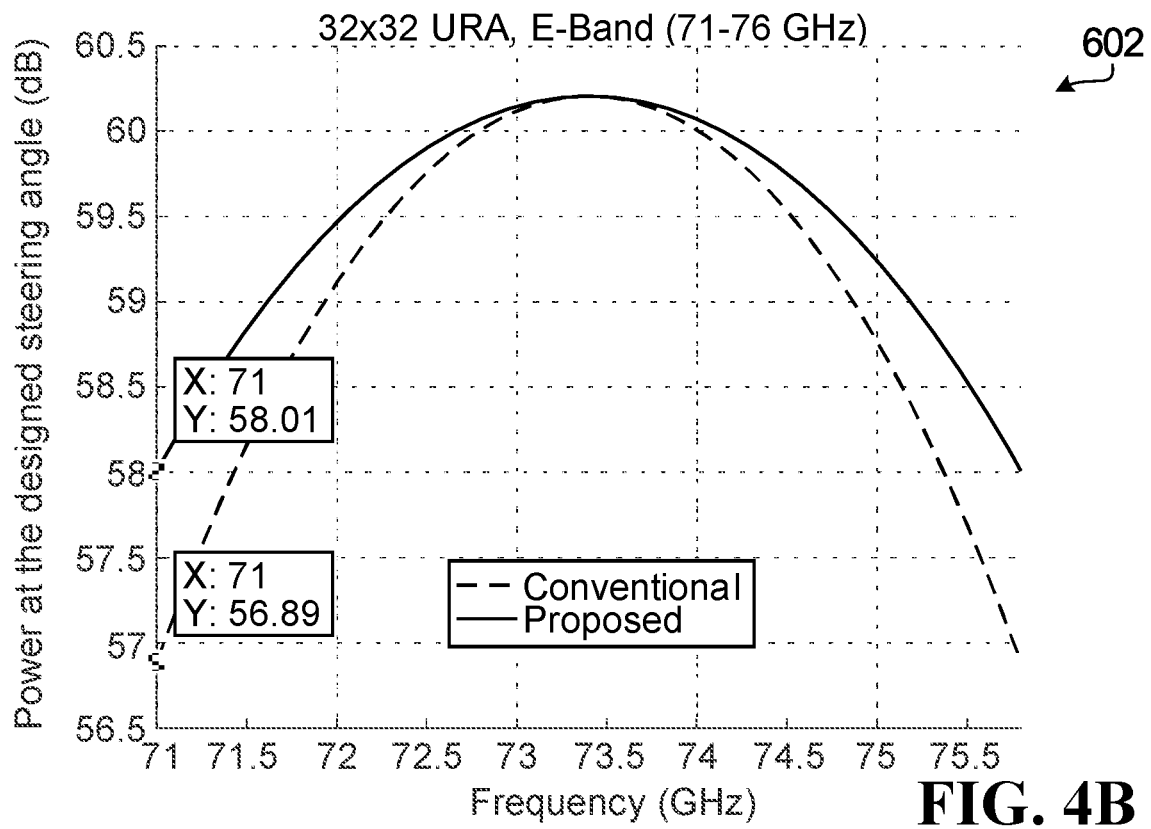
Figure 4C:
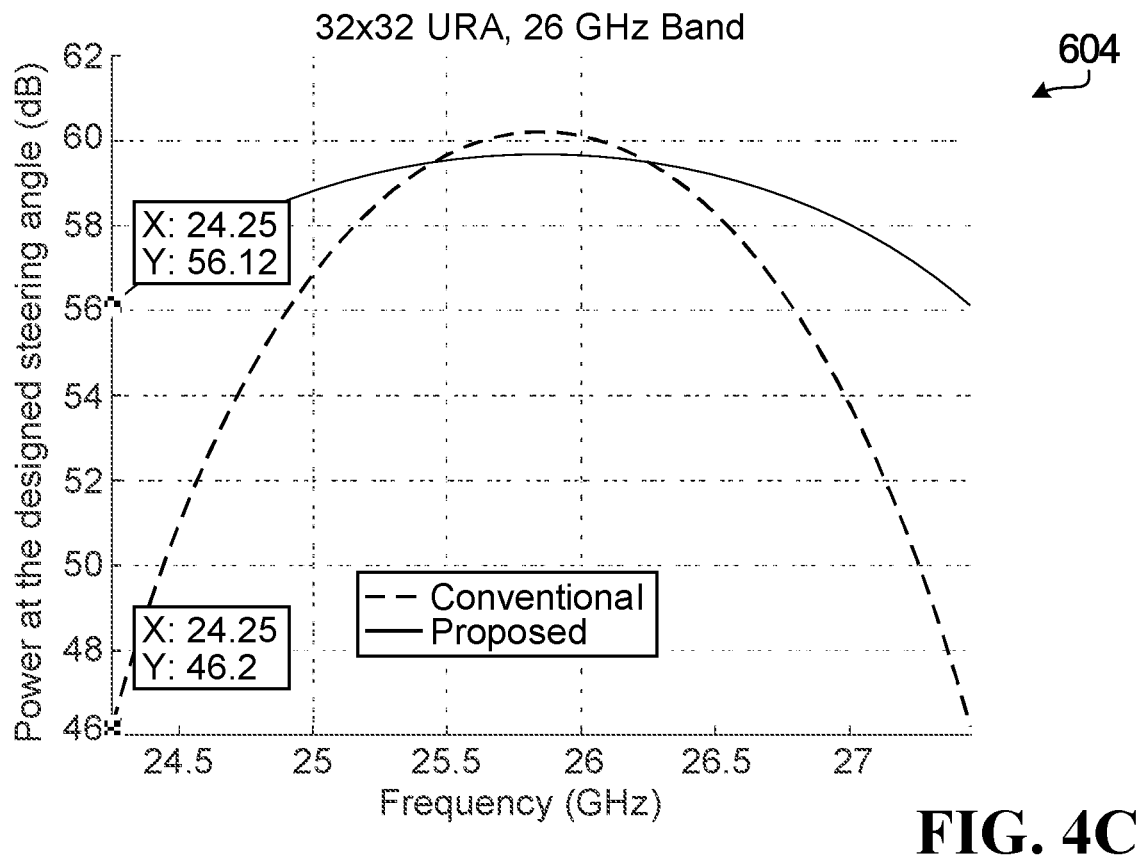
Figure 4D:
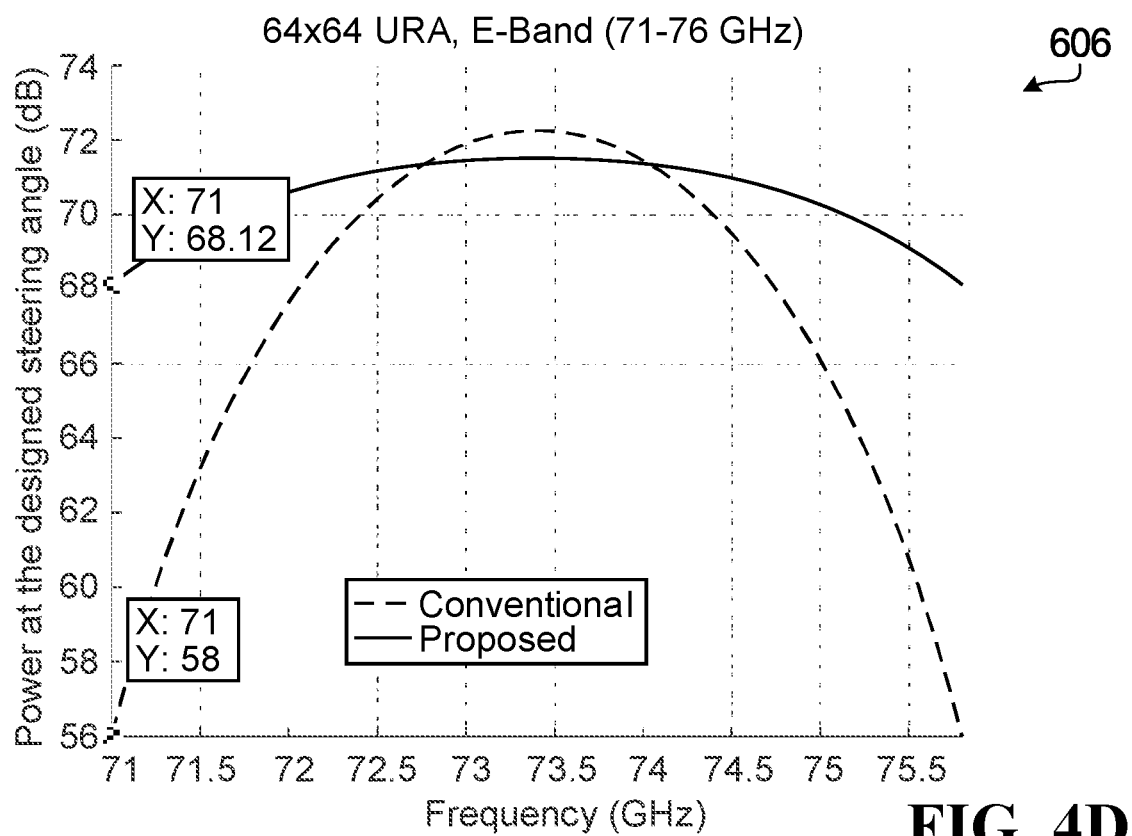

FIGS. 3A, 3B and 3C show a comparison of an original power pattern (conventional method) versus the pattern resulting from use of the provided method at the azimuth plane for $f=f_0$ generally indicated at 500, $f=f_{min}$, generally indicated at 502, and $f=f_{max}$, generally indicated at 504. It can be seen that, by using the provided method, the beam became wider and side lobe levels have decreased at $f_0$. At $f_{min}$, the beam peak angles increase to $\theta=32.21°$ and $\varphi=70.89°$ if conventional beamforming is used (the blue curve). The provided method pushes the beam to the left to mitigate the squint effect. However, at $f_{max}$, the beam peak angles decrease to $\theta=28.09°$ and $\varphi=53.19°$ with conventional beamforming; the proposed method pushes the beam to the right at this frequency to reduce the squint effect.

FIGS. 4A, 4B, 4C and 4D depict the power (dB) at the desired steering angle [30°, 60°] for all frequencies in the band using the conventional beamforming method (the solid curves) and the provided method (the dashed curves). Four different system configurations have been considered. Generally indicated at 600 are the curves for a 16×16 URA operating at f=24.25-27.45 GHz with $f_0$=25.85 GHz. It can be seen that the proposed method improves the power value at the whole bandwidth. The most improvement is at the edge frequencies which is 0.9 dB (30% improvement). Generally indicated at 602 are the curves for a larger URA, 32×32, operating at the same frequency band. It is observed that, for the larger array size, the provided method brings considerable improvement at the edge frequencies, with only some negligible power loss around the center frequency. Note that the maximum loss value is only 0.55 dB (happens at $f_0$), while the maximum improvement is 9.9 dB which happens at $f_{min}$ and $f_{max}$. Similar results can be observed at 604,606 which are respectively results for 32×32 and 64×64 URAs in E-band (71-76 GHz).

Embodiment With Different Priority Frequencies

To transform the multi-objective optimization problem in Eq. 4 to a single-objective problem, a weighted-sum method with equal weight was used. This approach is reasonable when all the frequencies in the band have the same priority. However, if different frequencies have different priorities in a system, one may combine the objective functions in Eq. 4 using different weighting coefficients. In this case, problem (III) in Eq. 5 will change to:

Problem (IV)

$$\max_{\{w_{nm}\}} \sum_{i=1}^{K} \gamma_i F(\theta_0, \varphi_0, f_i), \quad (11)$$

where $\gamma_i$s are weighting coefficients which are real positive and satisfy:

$$\sum_{i=1}^{K} \gamma_i = 1.$$

Figure 5:
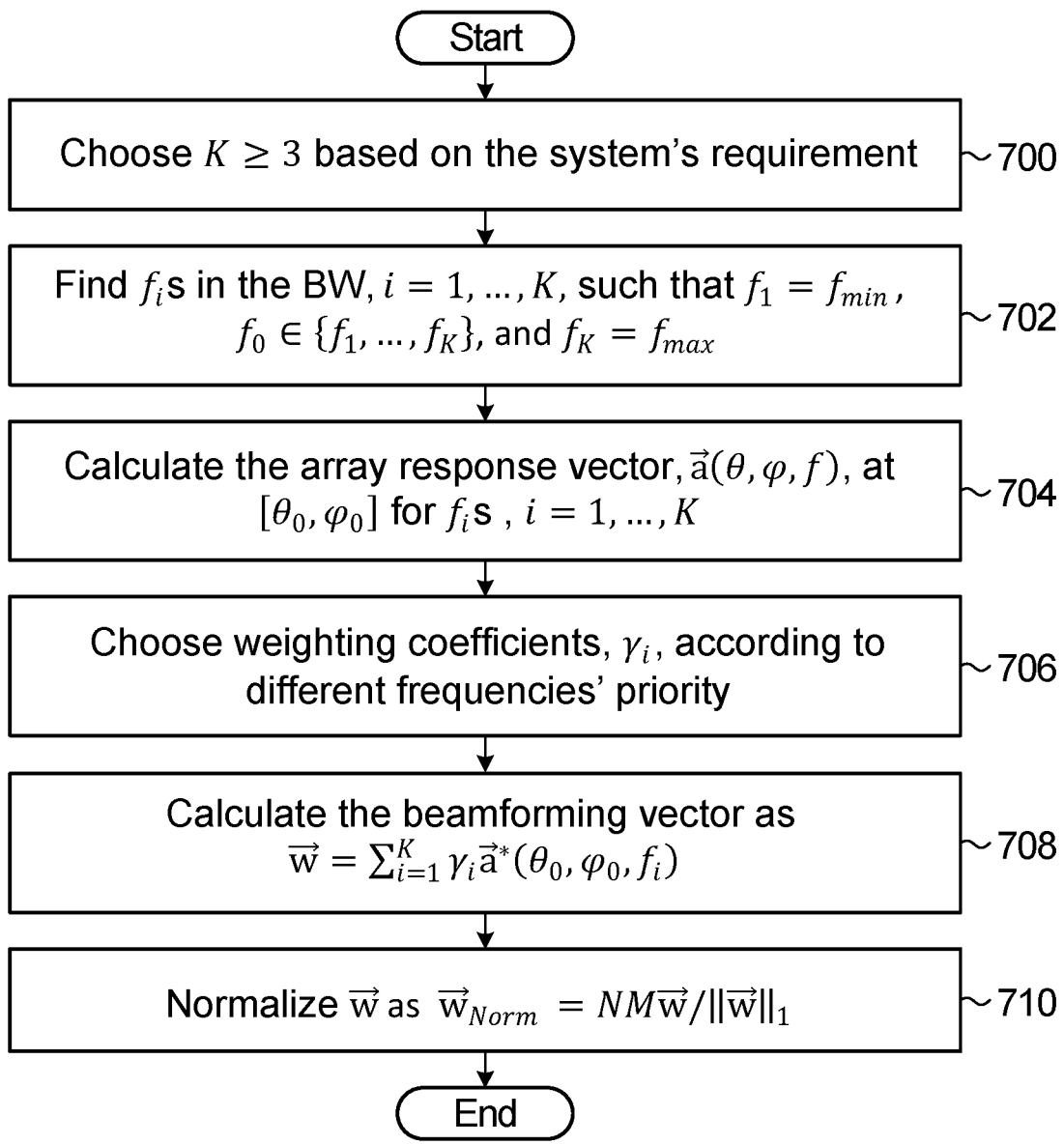
FIG. 5 is a block diagram of a method of beam forming provided by an embodiment of the disclosure.

Following an approach similar to that described above, the beamforming vector can be calculated as:

$$\vec{w} = \sum_{i=1}^{K} \gamma_i \vec{a}^*(\theta_0, \varphi_0, f_i), \quad (12)$$

which is weighted sum of the complex conjugate of array response vector, $\vec{a}(\theta,\varphi,f)$, calculated at the frequency points $f_i$ at the desired angle [$\theta_0$, $\varphi_0$]. An issue arises here is how to choose the weighting coefficients since the solution depends on these coefficients. It actually reflects how various priorities have been assigned to different frequencies in the band. A block diagram of a method in which different priorities for the frequency points are used is shown in FIG. 5. The method begins in block 700 with choosing based on the system's requirements. The method continues in block 702 with finding the frequency points $f_i$ in the BW, i=1, ..., K, such that $f_1=f_{min}$, $f_0 \in \{f_1, ..., f_K\}$, and $f_K=f_{max}$. The method continues in block 704 with calculating the array response vector, $a(\theta,\varphi,f)$, at [$\theta_0$, $\varphi_0$] for $f_i$s, i=1, ..., K. The method continues in block 706 with choosing a set of weighting coefficients which are real positive and satisfy: $\Sigma_{i=1}^{K}\gamma_i=1$. The method continues in block 708 with determining the beamforming weight vector according to $$\vec{w} = \sum_{i=1}^{K} \gamma_i \vec{a}^*(\theta_0, \varphi_0, f_i).$$

The method continues in block 710 with normalizing $\vec{w}$ as $\vec{w}_{Norm}=NM\vec{w}/\|\vec{w}\|_1$.

Similar to the previously described embodiment, this embodiment also improves the array gain at the whole frequency band by solving problem (IV). How much improvement can be achieved in each frequency depends on the weighting coefficients $\gamma_i$ used for weighted-sum method. Therefore, this embodiment gives flexibility to give differing priorities to different frequencies.

Figure 6:
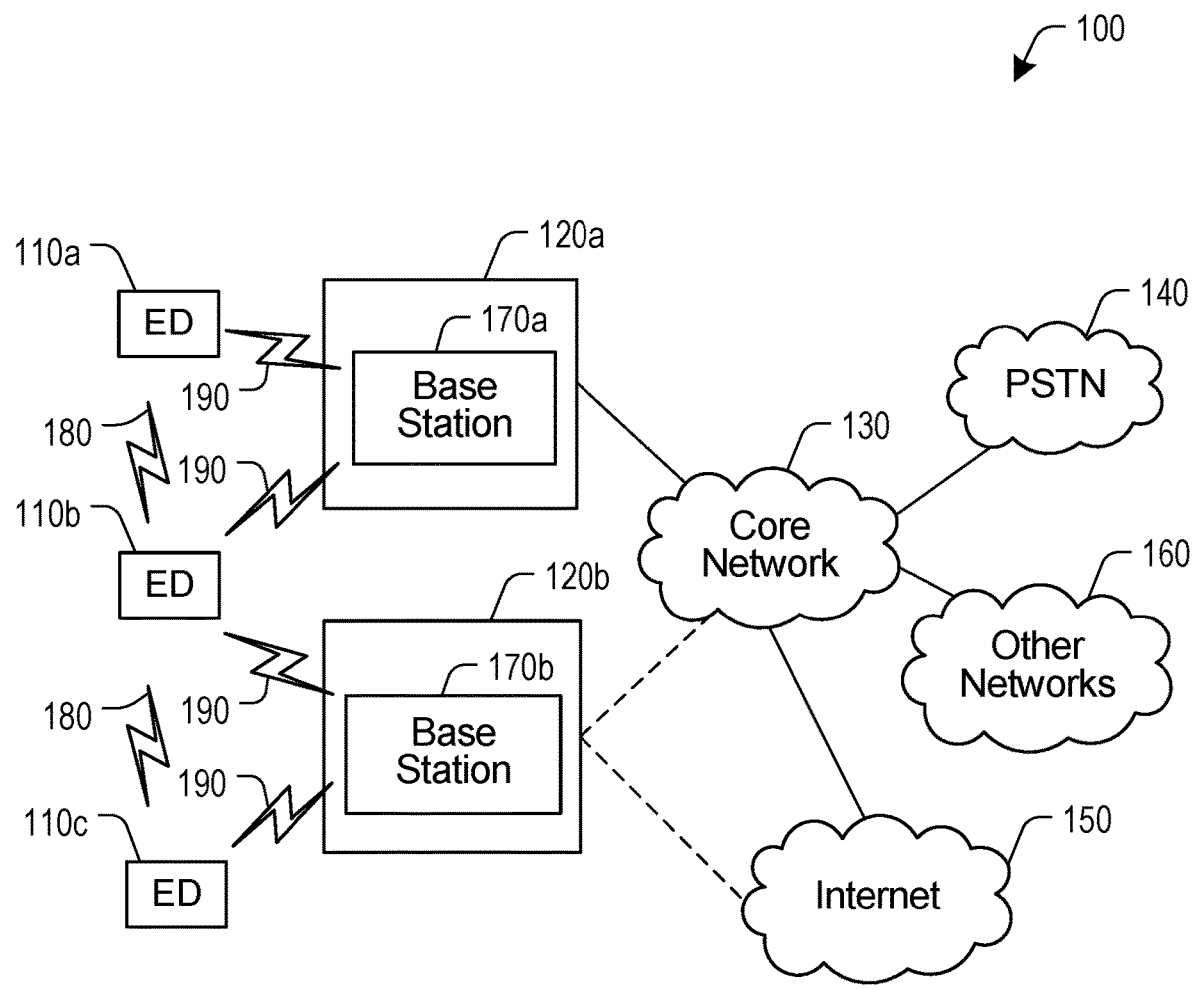
FIG. 6 shows an example of a network for implementing one or more embodiments of the disclosure.

FIG. 6 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 6, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 6, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 6, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 7A:
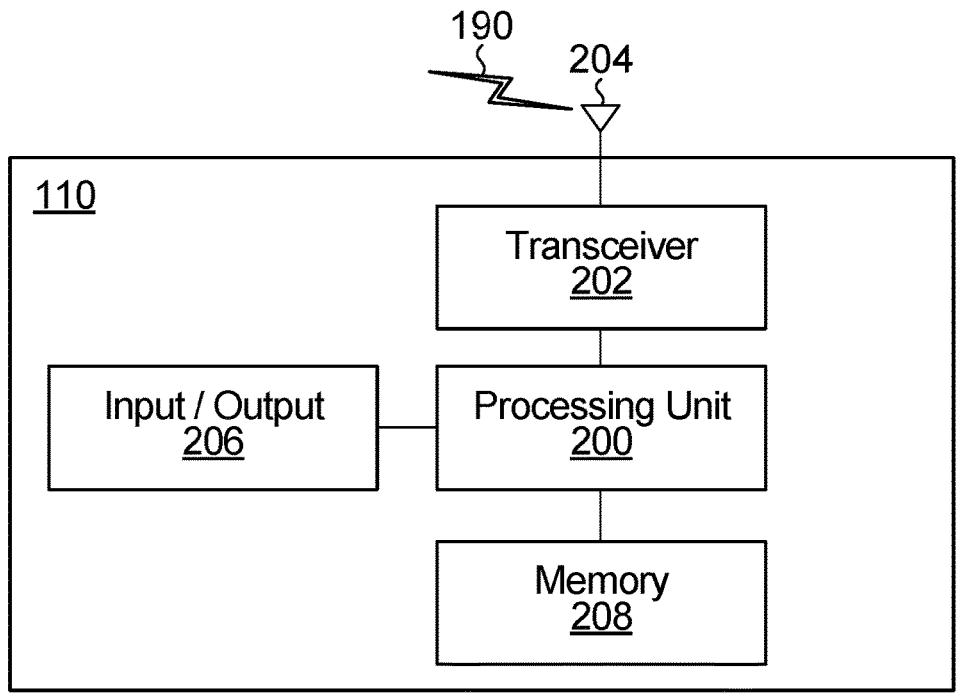
FIG. 7A is a block diagram of an example electronic device.
Figure 7B:
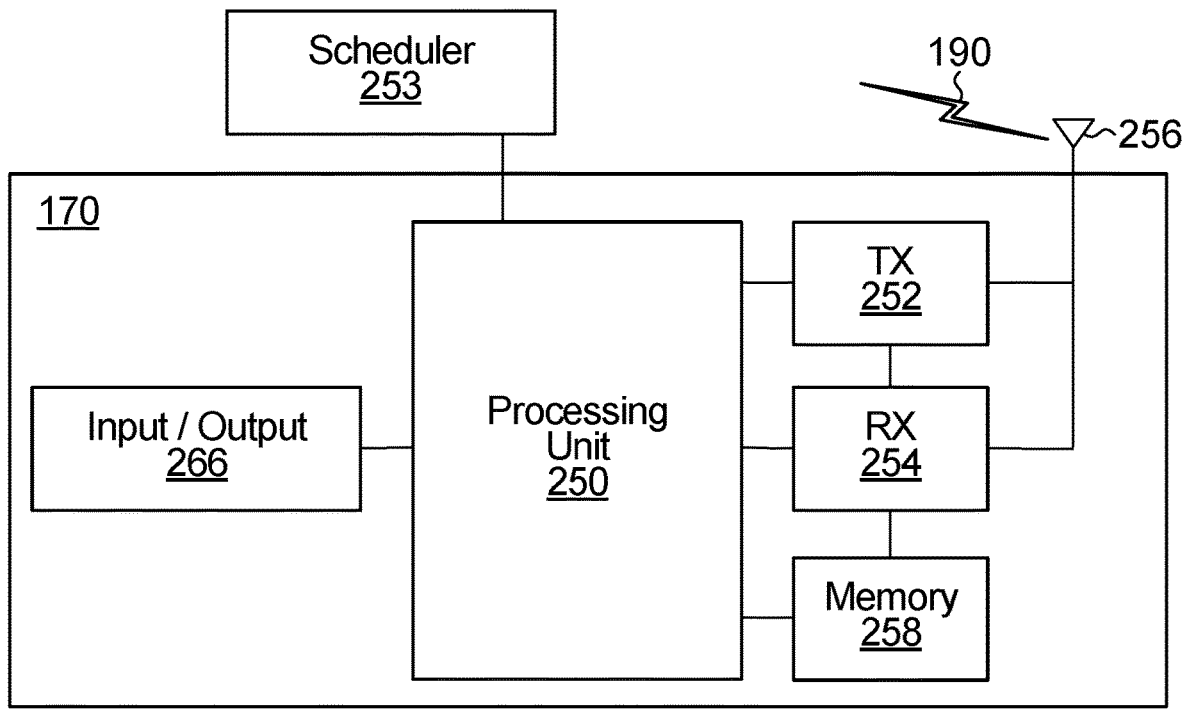
FIG. 7B is a block diagram of an example base station.

FIG. 7A and FIG. 7B illustrate example devices that may implement the methods and teachings according to this disclosure. In particular, FIG. 7A illustrates an example ED 110, and FIG. 7B illustrates an example base station 170. These components could be used in the communication system 100 or in any other suitable system. Note that where the electronic devices are mobile, the beam steering angle is not fixed. In such cases, in order to implement the described beam steering methods, a lookup table (or other structure) may be used that contains the beam steering coefficients for different beam steering angles. In some embodiments, interpolation is used to determine beam steering coefficients for beam steering angles that are not explicitly listed in the lookup table. In some embodiments, the frequency band also can be changed and each band needs its own beamforming coefficients computed using the described methods. In some embodiments, beam steering angles for different frequencies are also stored in a lookup table. In some embodiments, a base station such as that shown in FIG. 7B sends downlink signals to electronic devices using phased array antennas. The signal is wideband. To mitigate the squint effect (power loss at the edge frequencies vs the design frequencies) the proposed beamforming technique is deployed by the BS.

As shown in FIG. 7A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:

transmitting or receiving using a uniform phased array antenna having a plurality of antenna elements using a beamforming weight vector $\vec{w}$ containing beamforming weights, wherein each of the beamforming weights is for one of the plurality of antenna elements respectively;

wherein the beamforming weights are determined for a given steering angle, and for a given bandwidth $f_{min} \leq \text{frequency} = f \leq f_{max}$, that maximizes a sum of antenna response vectors over a set of K frequency points $f_i$, i=1, ..., K distributed within the given bandwidth, wherein K is an integer >=3, and the set of K frequency points includes $f_{min}$, $f_{max}$, and a design frequency, $f_0$, where $f_{min} \leq f_0 \leq f_{max}$; and wherein the beamforming weight vector meeting the following formula: $\vec{w} = [w_{11}, \ldots, w_{nm}, \ldots, w_{NM}]$, where $\vec{w}$ is the complex conjugate of a sum of antenna response vectors, $\vec{a}(\theta, \varphi, f)$, calculated at the K frequency points, where the given steering angle has elevation angle θ, and azimuth angle φ, where N and M are the number of antenna elements in two dimensions of the uniform phased array antenna, and N and M are positive integers.

2. The method of claim 1 wherein the sum is an equally weighted sum given by:

$$\vec{w} = \sum_{i=1}^{K} \vec{a}^*(\theta, \varphi, f_i).$$

3. The method of claim 1 wherein the sum of antenna response vectors is a weighted sum, with a respective weight applied to each antenna response vector.

4. The method of claim 3 wherein the beamforming weight vector, $\vec{w} = [w_{11}, \ldots, w_{nm}, \ldots, w_{NM}]$, is the complex conjugate of a weighted sum of antenna response vector, $\vec{a}(\theta, \varphi, f)$, calculated at the frequency points $f_i$, i=1, ..., K, where the given steering angle has elevation angle θ, and azimuth angle φ.

5. The method of claim 4 wherein the beamforming weight vector is given by:

$$\vec{w} = \sum_{i=1}^{K} \gamma_i \vec{a}^*(\theta_0, \varphi_0, f_i),$$

which is the weighted sum of the complex conjugate of antenna response vector, $\vec{a}(\theta,\varphi,f)$, calculated at the frequency points $f_i$ at the steering angle $[\theta_0, \varphi_0]$.

6. The method of claim 1 wherein the uniform phased array is a uniform linear array or a two-dimensional uniform planar array.

7. The method of claim 1 further comprising one or both of:
- obtaining the beamforming weights for a given steering angle $[\theta_0, \varphi_0]$ from a lookup table, and obtaining new beamforming weights from the lookup table as the steering angle changes;
- obtaining the beamforming weights for a given design frequency from a lookup table and obtaining new beamforming weights from the lookup table as the design frequency changes.

8. An apparatus comprising:
a uniform phased array antenna having a plurality of antenna elements; and
a processor and memory, wherein the memory comprising a set of beamforming weights containing a respective beamforming weight for each of the plurality of antenna elements and the processor is configured to apply the beamforming weights to the phased array antenna to configure the phased array antenna with the set of beamforming weights;
wherein the apparatus is configured to transmit or receive using the uniform phased array antenna configured with the set of beamforming weights;
wherein the beamforming weights are determined for a given steering angle, and for a given bandwidth $f_{min} \leq$ frequency$\leq f_{max}$, that maximizes a sum of antenna response vectors over a set of K frequency points $f_i$, i=1, ..., K, distributed within the given bandwidth, wherein K is an integer >=3, and the set of K frequency points includes $f_{min}$, $f_{max}$, and a design frequency $f_0$, where $f_{min} \leq f_0 \leq f_{max}$; and
wherein the beamforming weights comprise a beamforming weight vector, $\vec{w}=[w_{11}, \ldots, w_{nm}, \ldots, w_{NM}]$ that is the complex conjugate of a sum of antenna response vectors, $\vec{a}(\theta,\varphi,f)$, calculated at the frequency points, where the given steering angle has elevation angle $\theta$, and azimuth angle $\varphi$, where N and M are positive integers.

9. The apparatus of claim 8 wherein the sum is an equally weighted sum given by:

$$\vec{w} = \sum_{i=1}^{K} \vec{a}^*(\theta, \varphi, f_i).$$

10. The apparatus of claim 8 wherein the sum of antenna response vectors is a weighted sum, with a respective weight applied to each antenna response vector.

11. The apparatus of claim 10 wherein the beamforming weight vector, $\vec{w}=[w_{11}, \ldots, w_{nm}, \ldots, w_{NM}]$, is the complex conjugate of a weighted sum of antenna response vector, $\vec{a}(\theta,\varphi,f)$, calculated at the frequency points $f_i$, i=1, ..., K, where the given steering angle has elevation angle $\theta$, and azimuth angle $\varphi$.

12. The apparatus of claim 11 wherein the beamforming weight vector is given by:

$$\vec{w} = \sum_{i=1}^{K} \gamma_i \vec{a}^*(\theta_0, \varphi_0, f_i),$$

which is the weighted sum of the complex conjugate of antenna response vector, $\vec{a}(\theta,\varphi,f)$, calculated at the frequency points $f_i$ at the steering angle $[\theta_0, \varphi_0]$.

13. The apparatus of claim 8 wherein the uniform phased array is a uniform linear array or a two-dimensional uniform planar array.

14. The apparatus of claim 8 further comprising:
a lookup table containing said beamforming weights for different steering angles;
wherein the apparatus is configured to obtain the beamforming weights for a given steering angle $[\theta_0, \varphi_0]$ from the lookup table, and to obtain new beamforming weights from the lookup table as the steering angle changes.

15. The apparatus of claim 8 further comprising:
a lookup table containing said beamforming weights for different design frequencies;
wherein the apparatus is configured to obtain the beamforming weights for a given design frequency from the lookup table, and to obtain new beamforming weights from the lookup table as the design frequency changes.

16. A non-transitory computer readable medium having computer executable instructions stored thereon, that when executed by a processor cause execution of a method comprising:
transmitting or receiving using a uniform phased array antenna having a plurality of antenna elements using a beamforming weight vector $\vec{w}$ containing a respective beamforming weight for each of the plurality of antenna elements;
wherein the beamforming weights are determined for a given steering angle, and for a given bandwidth $f_{min} \leq$ frequency$\leq f_{max}$, that maximizes a sum of antenna response vectors over a set of K frequency points, $f_i$, i=1, ... K distributed within the given bandwidth, wherein K is an integer >=3, and the set of K frequency includes $f_{min}$, $f_{max}$, and a design frequency, $f_0$, where $f_{min} \leq f_0 \leq f_{max}$; and
wherein the beamforming weight vector meeting the following formula: $\vec{w}=[w_{11}, \ldots, w_{nm}, \ldots, w_{NM}]$, where $\vec{w}$ is the complex conjugate of a sum of antenna response vectors, $\vec{a}(\theta,\varphi,f)$, calculated at the frequency points $f_i$, where the given steering angle has elevation angle $\theta$, and azimuth angle $\varphi$, where N and M are non-zero positive integers.

17. The non-transitory computer readable medium of claim 16 wherein the sum is an equally weighted sum given by:

$$\vec{w} = \sum_{i=1}^{K} \vec{a}^*(\theta, \varphi, f_i).$$

* * * * *